INVENTORS
JAMES D. BROWN
LESTER HANSON

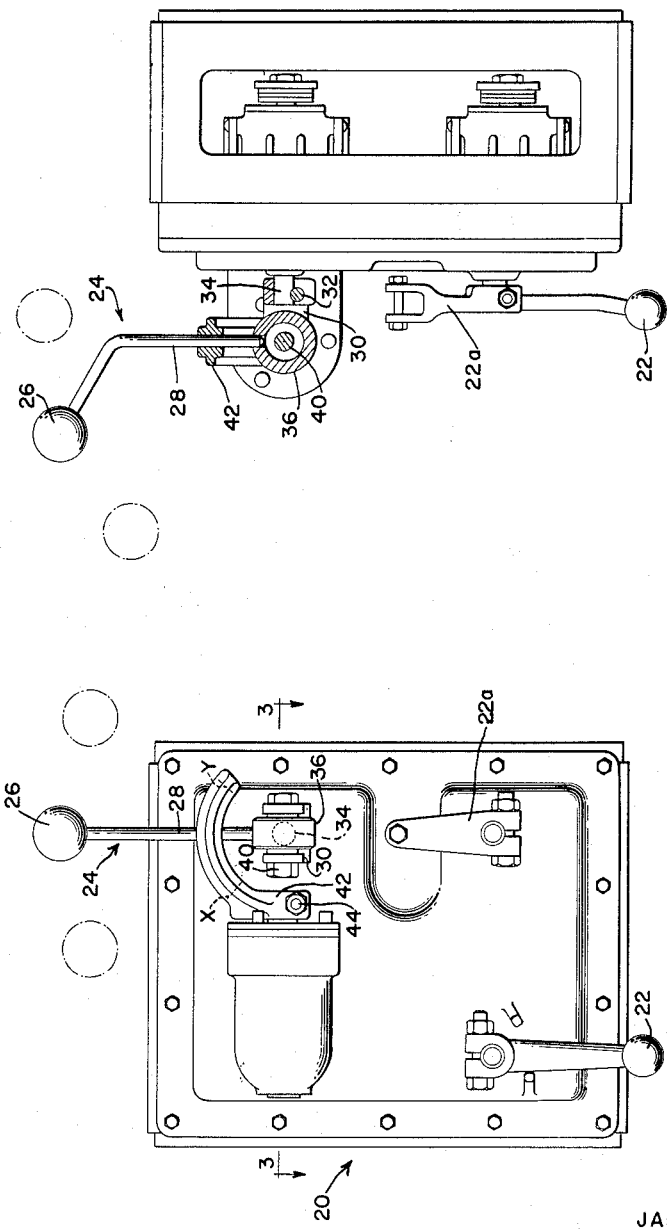

BY *Harold T. Stowell*
*Harold L. Stowell*

ATTORNEYS

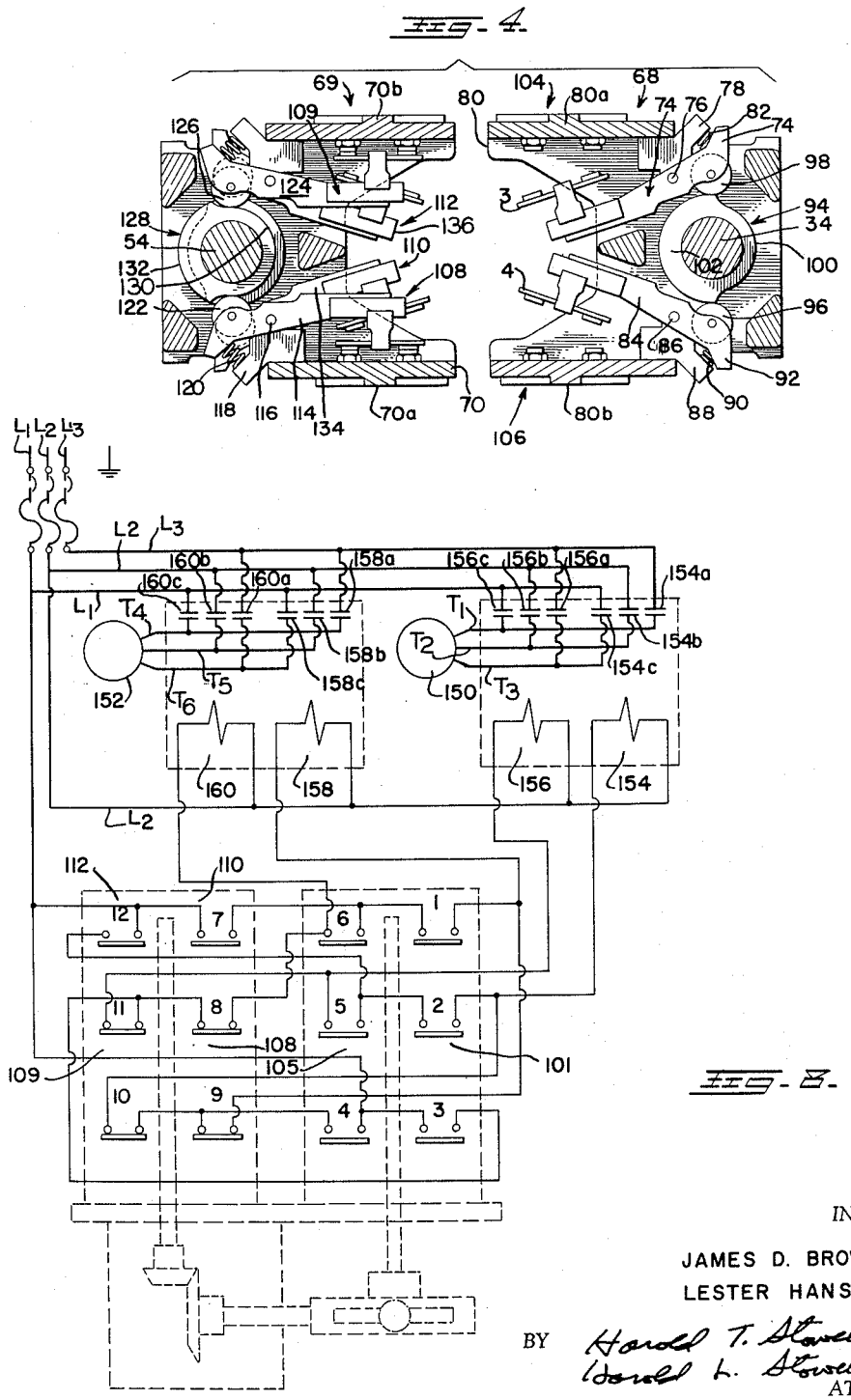

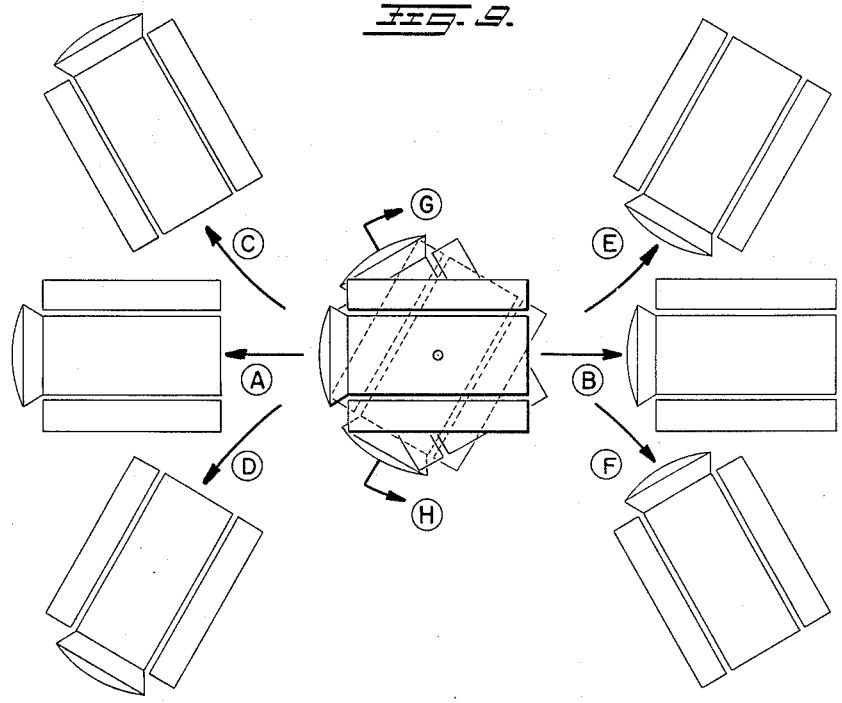

United States Patent Office 3,019,378
Patented Jan. 30, 1962

3,019,378
MANUAL MOTOR CONTROL DEVICE
James D. Brown and Lester Hanson, Salt Lake City, Utah, assignors to The Eimco Corporation, Salt Lake City, Utah, a corporation of Delaware
Filed Nov. 12, 1957, Ser. No. 695,956
5 Claims. (Cl. 318—65)

This invention relates to manual control devices and more particularly to mechanisms selectively operable with one hand to produce a plurality of diversified results individually or in any desired combination.

The manual control device of the invention finds utility in many fields where plural operations are to be performed which may advantageously be coordinated or centralized in a single control element. Uses of the control device of the present invention are many and varied and the device finds utility on, for example, automotive equipment, mobile material handling machines, road grading machinery and the like where dual reversible motors are employed.

A further object of the invention is to provide control mechanisms in which the actuation of the control handle is effected in a natural manner on the part of the person operating the device.

A further object is to provide such a device having a dependable neutral or "off" position.

Further objects are to provide control means that are very compact, mechanically simple, relatively inexpensive to manufacture, and simple to service.

These and other objects and advantages are provided by the present invention which generally comprises control means for a vehicle having left and right traction means, a reversible motor connected to each traction means, means connecting the motors to a source of energizing power, said connecting means including a first set of normally off controllers, a second set of normally off controllers, first actuator means for selectively turning on and off the first and second controllers, a third and fourth set of normally on controllers, a fifth and sixth set of normally off controllers, second actuator means for selectively turning on and off the third, fourth, fifth and sixth controllers, conductor means interconnecting at least one set of the normally on controllers and at least one set of normally off controllers to the forward and to the reverse positions of each of the reversible motors, and a single manually actuated member interconnected with the first and second actuator means.

The invention will be more particularly described with reference to the accompanying drawings wherein:

FIG. 1 is a front elevation view of a control panel for a vehicle including the mechanisms of the present invention;

FIG. 2 is a right side elevational view of the control panel of FIG. 1;

FIG. 4 is a section substantially on line 4—4 of FIG. 3;

FIG. 8 is a wiring diagram of a preferred from of the control mechanism; and

FIGS. 9 and 10 are diagrammatic views of various responses which may be obtained through the use of the present control means on a crawler mounted vehicle.

Figure 3:
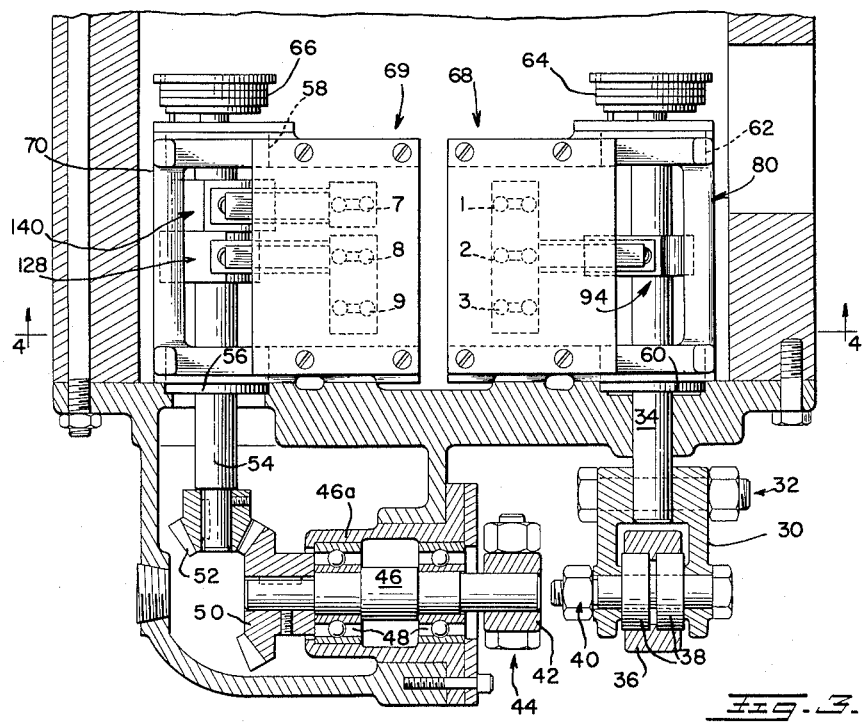
FIG. 3 is a sectional view substantially on line 3—3 of FIG. 1.
Figure 5:
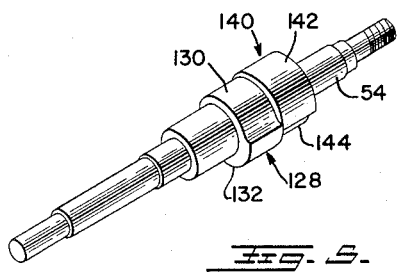
FIG. 5 is a perspective view of one of the actuating mechanisms of the present invention.
Figure 6:
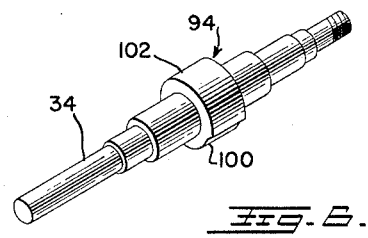
FIG. 6 is a perspective view of the other actuating member of the present invention.

Referring to the drawings the present invention will be described as embodied in a crawler mounted material handling machine of the type shown and claimed in United States patent application Serial No. 489,322, filed February 21, 1955, wherein the vehicle is propelled by paired lateral endless crawler chains driven by reversible motors. In the specific embodiment of this invention the reversible motors are electric, however, it will be apparent that the principles of the invention are equally applicable to pressure fluid motors operated by compressed air, hydraulic fluid or the like.

In the drawings 20 generally designates a control panel for a material handling machine. It receives its power from a conventional switch not located in this control. Handles 22 and 22a control auxiliary equipment and form no part of the present invention. Positioned above the switch means 22 and 22a is a single manual control handle 24 having a gripping knob 26 secured to the upper end thereof. The extended shaft 28 of the control handle 24 is secured at its lower end in a bracket assembly 30. One end of the bracket 30 is secured by nut and bolt assembly 32 to the unextended end of a switch control shaft 34. The other end of the bracket 30 rotatably receives a sleeve 36 to which the extended end 28 of the control handle is mounted. The sleeve 36 is mounted to the bracket by nut and bolt assembly 40 through anti-friction bearings 38 whereby the control handle may be pivoted about the axis of the bolt 40.

The shaft 28 also passes through a quadrant 42 secured by nut and bolt assembly 44 to a stub shaft 46. The stub shaft 46 is rotatably mounted in bearing cartridge 46a in the housing 20 by anti-friction bearings 48 whereby the shaft 46 may be rotated by movement of the control handle 24 at right angles to the axis of said shaft. The quadrant 42 is slotted from point $x$ to point $y$, FIG. 1 of the drawings, so that the control handle may also be pivoted at right angles to the actuator shaft 34 with or without movement of the quadrant 42. With the foregoing arrangement of parts it will be seen that the control handle 24 has limited universal movement and may be moved by the operator at right angles to shafts 34 and 46 to independently rotate each of these shafts or the control handle may be moved at some intermediate angle whereby each of the shafts 34 and 46 are simultaneously rotated.

The remote end of shaft 46 has secured thereto a bevel gear 50 which is in mesh with a bevel pinion 52 secured to the extended end of a second actuator shaft 54. Acctuator shaft 54 is mounted for rotation in the switch frame 70 by anti-friction bearing means 56 and 58 while the other control shaft 34 is similarly mounted within the switch frame 80 by anti-friction bearings 60 and 62. Further, each of the control shafts 34 and 54 is provided with centering springs 64 and 66 which urge their respective shafts 34 and 54 to a predetermined position and will cause the control handle 24 to return to a predetermined neutral position when the operator removes any turning or pulling force applied to the manual control handle.

By way of example, control rod 34 operates plural sets of switches generally designated 68 and will be referred to as the forward and reverse switches while control rod 54 actuates further sets of switches generally designated 69 and will be referred to as the turn switches.

The plural sets of switches 68 include in the specific embodiment shown in the drawings six pairs of contacts designated 1 to 6 with contacts 1, 2 and 3 being operable as a unit and contacts for 4, 5 and 6 being operable as a unit. Each of these two units comprises a switch set. Contacts 1, 2 and 3 of switch set 101 are secured to a pivot arm 74 connected by pivot pin 76 to a bracket 78 carried by the terminal board 80a of switch frame 80. A coil spring 82 between the bracket 78 and one end of the pivot arm 74 normally urges that end of the pivot arm toward the shaft 34 as more clearly shown in FIG. 4 of the drawings. The other switch set 105 of switch 68 comprising contacts 4, 5 and 6 is secured to a further pivot arm 84 mounted on pivot pin 86 carried by bracket 88, the extended end of which receives a coil spring 90 normally urging the remote end 92 of pivot arm 84 toward shaft 34.

The pivot arms 74 and 84 are actuated by rotation of shaft 34 through a cam element 94, secured to the shaft 34 upon which rollers 96 and 98, rotatably mounted in their respective arms, roll. The cam element 94 is provided with a low surface 100 and a high surface 102 and the cam is secured to the shaft 34 so that the switches are in the open position as shown in FIGS. 4 and 8 when the control handle 24 is in the vertical positon whereby rotating the control handle and shaft 34 to the right as seen in FIG. 4 roller 96 drops off the high surface 102 of the cam closing switches 4, 5 and 6 and when the control handle and shaft 34 is rotated to the left roller 98 drops off the high surface 102 of the cam closing switches 1, 2 and 3. It will be noted that the extent of the high portion of the cam 102, the relative positions of rollers 90 and 98, are so selected that it is not possible to position the cam 94 so that both sets of switches 1 through 3 and 4 through 6 are both closed.

The other terminals for switch sets 1 through 3 and 4 through 6 are maintained along the opposed faces of the terminals boards 80a and 80b on switch frame 80 and are designated 104 and 106 respectively.

The other control shaft 54 actuates four sets of switches generally designated 108, 109, 110 and 112 comprising switches 8 and 9, 10 and 11 and 7 and 12 respectively as shown in FIGS. 4 and 8.

Switches 8 and 9 making up switch set 108 are controlled in unison by pivot arm 114 mounted to pivot shaft 116 carried by the bracket 118 secured to the terminal board 70a which is mounted on switch frame 70. A coil spring 120 urges the switch set 108 into the closed position and the pivot arm 114 is provided with a cam roller 122.

Switches 10 and 11 making up switch set 109 are actuated by pivot shaft 124 similarly pivotally mounted to the terminal board 70b which is mounted on switch frame 70 and provided with a cam roller 126. Rollers 122 and 126 for pivot arms 114 and 124 contact cam element generally designated 128 secured to the shaft 54. Cam element 128 is provided with a low portion 130 and a high portion 132 and is so positioned upon the shaft 54 relative to the cam rollers 122 and 126 that when the control handle is in a vertical position or not angularly displaced relative to the axis of rotation of stub shaft 46 both of the rollers are near the low portion 130 of the cam element or off the high portion 132 whereby switch sets 108 and 109 comprising switches 8 and 9, and 10 and 11 are in the engaged position shown in FIGS. 4 and 8 of the drawings.

Figure 7:
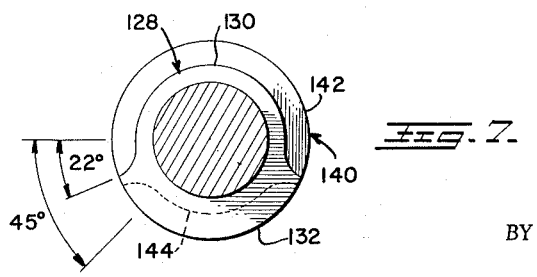
FIG. 7 is an end view of the actuator shown in FIG. 5.

Switch set 110 comprising switch element 7 is mounted on pivot arm 134 provided with spring means and cam rollers as described with reference to the other switch sets. Swith 112 comprising switch element 12 is actuated by pivot arm 136 similarly provided with spring means and a cam roller. The cam rollers for switch sets 110 and 112 contact a second cam element 140 which is also secured to shaft 54 and is provided with a high surface 142 and a low surface 144 more clearly shown in FIG. 7. The cam element 140 is positioned upon the shaft 54 relative to the cam rollers for switch sets 110 and 112 so that when the shaft 54 is in the neutral position switch sets 110 and 112 are disengaged from their complementary contact elements secured to the outer surface of the terminal board 70a and 70b mounted on switch frame 70 as described with reference to switch 68.

The extent of the high portion 142 of cam 140 and the relative position of the cam element upon the shaft 54 is such that upon rotation of the shaft 54 in a counterclockwise direction switch set 110 moves to the engaged position while clockwise rotation of the shaft 54 through its connection with manual control lever 24 places switch set 112 in the engaged position. It will further be noted that when switch set 110 is in engaged position switch set 112 is in the disengaged position or when switch set 112 is in the engaged positon switch set 110 is in the disengaged position. The switch sets 110 and 112 are only in the same position, that is the disengaged position, when the shaft 54 is in its neutral position.

The electrical connections between the switches of each set and between various sets, the power source and the reversible traction motors will now be described with reference to FIG. 8. In FIG. 8 the right traction motor is designated generally 150 and is provided with forward direction contactor 156 and a reverse direction contactor 154. The left traction motor is designated 152 and is provided with a forward direction contactor 160 and a reverse direction contactor 158. The particular external electric source employed in the illustrated form of the invention is three phase and comprises lines L1, L2 and L3. Contactors 154, 156, 158 and 160 comprise conventional electric magnetic actuators. When contactor 154 is energized through at least two of the switches 1 through 12 it closes normally open switches 154a, 154b and 154c, which connect lines L1, L2 and L3 to corresponding lines T3, T2 and T1 of right traction motor 150 for "reverse" operation of the motor.

When contactor 156 is energized through at least two of the switches 1 through 12 it closes normally open switches 156a, 156b and 156c which connect lines L1, L2 and L3 to corresponding lines T1, T2 and T3 of right traction motor 150 in the reversing relationship for "forward" operation of the motor.

When contactor 158 is energized through at least two of the switches 1 through 12 it closes normally open switches 158a, 158b and 158c which connect lines L1, L2 and L3 to corresponding lines T6, T5 and T4 of left traction motor 152 in the reverse relationship for reverse operation of the motor.

When contactor 160 is energized through at least two of the switches 1 through 12 it closes normally open switches 160a, 160b and 160c which connect lines L1, L2 and L3 to corresponding lines T4, T5 and T6 of left traction motor 152 in the forward relationship of the motor.

The coils of contactor 154, 156, 158 and 160 are energized by line current from line L2 and line L1. Line L1 is directly connected to switch set 101 at switch 3; switch set 105 at switch 4; switch set 110 at switch 7 and switch set 112 at switch 12. In addition to these connections the right traction motor 150 forward drive contactor 156 is connected to switch set 105 through switch 5; and switch set 109 through switch 11 while the reverse contactor 154 is connected to switch set 101 through switch 2 and switch set 109 through switch 10.

The forward contactor 160 for motor 152 is connected to switch set 105 through switch 6; and switch set 108 through switch 8 while the left traction motor reverse contactor 158 is connected to switch set 101 through switch 1 and switch set 108 through switch 9. In addition one contact of the following switches are interconnected 1, 6 and 7; 2, 5 and 12; 3, 8 and 11; and 4, 9 and 10.

By interconnecting the switch sets and the various switches in the sets with the reverse and forward contactors for motors 150 and 152 it will be seen that at least one normally engaged switch set and at least one normally disengaged switch set are connected in series to the forward and reverse contactors for each of the dual motors so that no current flows to either traction motor when the control handle is in the neutral position, and that current will only flow to the reverse or forward contactors of the dual motors in a predetermined arrangement corresponding to the natural position of the control handle to effect such movement. The foregoing will

| | | TYPE OF MOTION | | | | | | | | | | | | | | | |
|---|---|---|---|---|---|---|---|---|---|---|---|---|---|---|---|---|---|
| | | Ⓐ | | Ⓑ | | Ⓒ | | Ⓓ | | Ⓔ | | Ⓕ | | Ⓖ | | Ⓗ | |
| Position of Control Handle | | 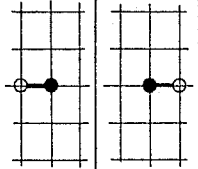 | | 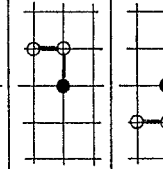 | | 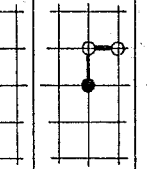 | | 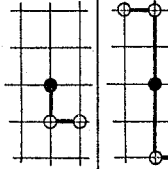 | | 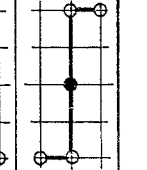 | |  | |  | | | |
| Position of Contacts  O = Open  C = Closed | 1 | C | | O | | C | | C | | O | | O | | C | O | C | O |
| | 2 | C | | O | | C | | C | | O | | O | | C | O | C | O |
| | 3 | C | | O | | C | | C | | O | | O | | C | O | C | O |
| | 4 | O | | C | | O | | O | | C | | C | | O | C | O | C |
| | 5 | O | | C | | O | | O | | C | | C | | O | C | O | C |
| | 6 | O | | C | | O | | O | | C | | C | | O | C | O | C |
| | 7 | O | | O | | O | | O | | O | | O | | O | C | C | O |
| | 8 | C | | C | | C | | O | | C | | O | | C | O | O | C |
| | 9 | C | | C | | C | | O | | C | | O | | C | O | O | C |
| | 10 | C | | C | | O | | C | | O | | C | | O | C | C | O |
| | 11 | C | | C | | O | | C | | O | | C | | O | C | C | O |
| | 12 | O | | O | | O | | O | | O | | O | | C | O | O | C |
| Left Track | | On Forward | | On Backward | | On Forward | | Off | | On Backward | | Off | | On Forward | | On Backward | |
| Right Track | | On Forward | | On Backward | | Off | | On Forward | | Off | | On Backward | | On Backward | | On Forward | |

|  |  | TYPE OF MOTION | | | | | | | |
|---|---|---|---|---|---|---|---|---|---|
| | | I | J | K | L | M | N | O | P |
| Position of Control Handle | | | | | | | | | |
| Position of Contacts O = Open C = Closed | 1 | C | C | C | C | O | O | O | O |
| | 2 | C | C | C | C | O | O | O | O |
| | 3 | C | C | C | C | O | O | O | O |
| | 4 | O | O | O | O | C | C | C | C |
| | 5 | O | O | O | O | C | C | C | C |
| | 6 | O | O | O | O | C | C | C | C |
| | 7 | O | O | O | C | O | O | C | O |
| | 8 | C | O | C | O | C | O | O | C |
| | 9 | C | O | C | O | C | O | O | C |
| | 10 | O | C | O | C | O | C | C | O |
| | 11 | O | C | O | C | O | C | C | O |
| | 12 | O | O | C | O | O | O | O | C |
| Left Track | | On Forward | Off | On Forward | On Backward | On Backward | Off | On Forward | On Backward |
| Right Track | | Off | On Forward | On Backward | On Forward | Off | On Backward | On Backward | On Forward | be more apparent with reference to FIGS. 9 and 10 and the illustrated Examples A to P.

Each of the following Examples A through P is keyed to one of the diagrammatic showings A through P in FIGS. 9 and 10 of the application drawings and the examples include the position of the control handle 24 to achieve the desired direction; which of the twelve switches are engaged and which are disengaged; and the motion imparted to the left and right ground engaging traction means of the crawler tractor. For instance, Example A for forward motion of the vehicle both tracks go forward with power on both tracks. To effect this forward motion the handle is moved from its centered position to the forward position. With the control handle in the forward position switches 1, 2 and 3 are engaged completing one circuit through L1 through switches 3 and 8 to the left traction motor forward contactor 160 to line L2 completing the circuit to that motor. The other circuit completed is from line L1 through switches 3, 11 to the right traction motor forward contactor 156 to line L2. It will be noted the closing of switches 1 and 2 have no effect on this particular operation because switches 7 and 12 remain in the open or disengaged position.

Similarly, with reference to Example B the reverse or backward movement of the vehicle where both tracks go backward with power on both tracks the control handle is moved to the backward or rearward position engaging switches 4, 5 and 6 completing one circuit from line L1 through switches 4 and 9 to the left traction motor reverse contactor 158 to line L2. The other circuit completed is from line L1 through switches 4 and 10 to the right traction motor reverse contactor 154 to line L2. The closing of contacts 5 and 6 have no effect on this particular operation as again contacts 7 and 12 are in the disengaged position.

It will be noted that in each of the plural examples only one position of the control handle will accomplish the particular motion of the vehicle and that position of the control handle is a natural position but for Examples G and H the spin turns from a standing position. With reference to Examples G and H the spin turns to the right or to the left from a standing position it will be noted that there are two positions for the control handle and two complete switch set ups which give the same results. Each of these two positions of the control handle for Examples G and H is a natural position depending upon the thinking of the operator. For example, in a spin turn where power is applied to one track in a forward direction and power to the other track is in a reverse direction whereby the vehicle turns on its own radius about a point the operator may consider that he is making a forward spin turn to the right or a reverse spin turn to the left both being the same actual movement, however, the exact opposite position of the control handle is required.

From the foregoing description of a preferred embodiment of the present invention and the examples of the operation of the device applied to a crawler tractor it will be seen that the aims, objects and advantages of the invention are fully accomplished. It will further be appreciated that while the invention has been described with reference to reversible electric motors having electric contactors to connect the motors to the power source, pressure fluid motors with electric or pressure fluid operated valves for forward and reverse operation of the motors may be substituted for the plural sets of switches without departing from the scope of the present invention.

Having described our invention what is claimed is:

1. Electric control means for a vehicle having left and right traction means, an electric motor connected to each traction means and having forward and reverse contactors, means connecting said motors to a source of electric power, said means including; a first set of normally disengaged switches, said first set of switches comprising three switch elements, a second set of normally disengaged switches, said second set of switches comprising three switch elements, first actuator means for selectively engaging and disengaging said first and second set of switches, a third and fourth set of normally engaged switches, said third and fourth set of switches each comprising two switch elements, a fifth and sixth set of normally disengaged set of switches, said fifth and sixth set of switches each comprising one switch element, second actuator means for selectively engaging and disengaging the third, fourth, fifth and sixth set of switches, conductor means interconnecting at least one normally engaged set and at least one normally disengaged set of switches to the forward and reverse contactors of each of said motors, and a single manually actuated control arm interconnected with said first and second actuator means.

2. The invention defined in claim 1 wherein each of the switch elements of each switch set are engaged in unison.

3. Electric control means for a vehicle having left and right traction means, an electric motor having forward and reverse contactors connected to each traction means, means connecting said motors to a source of electric power, said means including; a first set of normally engaged switches, a second set of normally disengaged switches, first actuator means, a common cam member secured to said first actuator means for selectively engaging and disengaging said first and second set of switches, a third and fourth set of normally engaged switches, a fifth and sixth set of normally disengaged set of switches, second actuator means, a second cam element secured to said second actuator means for selectively engaging and disengaging the third and fourth switch sets, a third cam element secured to said second actuator means for selectively engaging and disengaging the fifth and sixth switch sets, conductor means interconnecting at least one normally engaged set of switches and at least one normally disengaged set of switches to the forward and reverse contactors of each of said motors, and a single manually actuated control arm interconnected with said first and second actuator means.

4. Control means for a vehicle having a pair of reversible motors; each of said motors having a forward controller and a reverse controller; first and second groups of switches; each of the first and second groups of switches including a pair of banks of switches; each of said first and second groups of switches comprising a normally open primary switch in each of said banks connected to a source of power; the second of said groups of switches including a normally closed secondary switch in each bank of the second switch group connected in series to one primary switch of the first group of switches and to the forward controllers of each of said motors, and a normally closed secondary switch in each bank of the second switch group connected in series to the other primary switch of the first group of switches and to the reverse controllers of each of said motors; the first of said groups of switches including a normally open secondary switch in each bank of the first switch group connected in series to one primary switch of the second group of switches and to a forward controller and a reverse controller of one of said motors, and a normally open secondary switch in each bank of the first switch group connected in series to the other primary switch of the second group of switches and to a forward controller and a reverse controller of the other of said motors; independently actuatable means for closing all of the switches in either of the banks alternatively of the first of said group of switches; further independent actuatable means for opening the secondary switches and closing the primary switches in either of the banks alternatively of the second of said groups of switches, and for opening the secondary switches only in either of the banks alternatively of the second of said groups of switches.

5. A control system for a vehicle having left and right traction means; right and left motors for driving said traction means; a forward contactor and a reverse contactor for each of said motors; means interconnecting said motors to a source of power, comprising a plurality of controllers, each actuatable between a closed position permitting power flow and an open position blocking power flow from the source of power to the motors; means connecting a first, second, third, and fourth controller to the source of power; means connecting said first controller to said motors, said means including a fifth controller in series between said first controller and said forward contactor for the right motor, and a sixth controller in series between the first controller and said forward contactor for the left motor; means connecting said second controller to said motors, said means including a seventh controller in series between said second controller and said reverse contactor for the right motor, and an eighth controller in series between said second controller and said reverse contactor for the left motor; means connecting said third controller to said right motor, said means including a ninth controller in series between said third controller and said reverse contactor for the right motor and a tenth controller in series between said third controller and said forward contactor for the right motor; means connecting said fourth controller to said left motor, said means including an eleventh controller in series between said fourth controller and said reverse contactor for the left motor, and a twelfth controller between said fourth controller and said forward contactor for the left motor; a control arm mounted for universal movement from a neutral position; first and second actuators interconnected to said control arm and movable in response to movement of said control arm from said neutral position; resilient means normally holding the control arm in said neutral position and said first, second, third, fourth, ninth, tenth, eleventh and twelfth controllers open and said fifth, sixth, seventh and eighth controllers closed; said first actuator being mounted to close said first, ninth, and eleventh controllers in response to forward motion of said control arm, and to close said second, tenth and twelfth controllers in response to rearward motion of said control arm; and said second actuator being mounted to first open said fifth and seventh controllers upon right lateral motion of said control arm and then to close said third controller upon further right lateral motion of said arm, and to first open said sixth and eighth controllers upon left lateral motion of said control arm and then to close said seventh controller upon further left lateral motion of said control arm.

References Cited in the file of this patent

UNITED STATES PATENTS

| 2,535,850 | Hammond | Dec. 26, 1950 |
| 2,622,161 | Harter | Dec. 16, 1952 |
| 2,677,795 | Nielsen | May 4, 1954 |

FOREIGN PATENTS

| 697,331 | Germany | Oct. 11, 1940 |